United States Patent Office 3,361,717
Patented Jan. 2, 1968

3,361,717
EPOXY RESINS AND PREPARATION THEREOF
Everett E. Gilbert, 7 Frederick Place, Morristown, N.J. 07960; Oliver A. Barton, 49 Afton Place, Florham Park, N.J. 07932; Ralph M. Hetterly, Washington Valley Road, Morristown, N.J. 07960; Edward R. Degginger, 416 Kimber Road, Syracuse, N.Y. 13224; and Colin R. McArthur, 110 North Way, Camillus, N.Y. 13031
No Drawing. Filed July 28, 1966, Ser. No. 568,416
4 Claims. (Cl. 260—47)

This invention relates to new and useful epoxy resins and their preparation. More particularly, this invention relates to epoxy resins prepared from bisphenols selected from the group consisting of 2,2-bis(4'-hydroxyphenyl)-1,1a,3,3a,4,5,5,5a,5b,6 - decachlorooctahydro-1,3,4-metheno-2H-cyclobuta[cd]pentalene and derivatives thereof having one or both of the positions ortho to each phenolic hydroxy group substituted with alkyl and/or halogen substituents.

It is well known to produce epoxy resins by reacting epichlorohydrin with 2,2-bis(4-hydroxyphenyl)propane. However, such epoxy resins burn readily and are unsuitable for applications where a flame-resistant material is required. Attempts have been made to prepare epoxy resins of reduced flammability by employing halogenated derivatives of the above bisphenol such as 2,2-bis(3,5-dichloro-4-hydroxyphenyl)propane, but only relatively minor improvements have been obtained.

It is therefore an object of the present invention to provide novel epoxy resins having improved flame resistance.

Another object of this invention is to provide a process by which high yields of said flame-resistant epoxy resins can be obtained.

The novel epoxy resins of the present invention are represented by the following formula

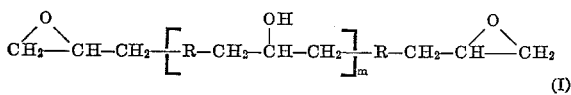

(I)

where $m$ is an integer of 0 to 5 and R is the group

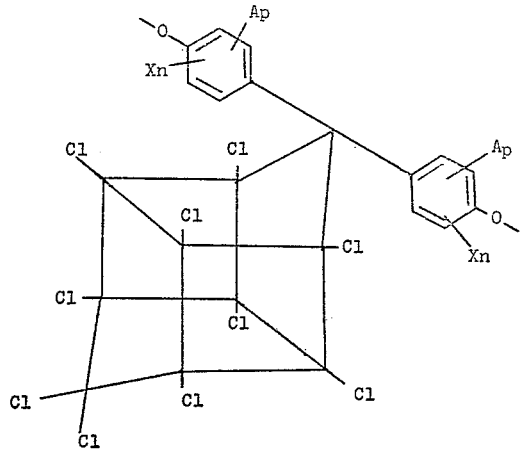

wherein A and X are substitutes for hydrogens in positions ortho to the oxygen atoms with substitution on the two benzene rings being identical; A is alkyl, preferably having 1 to 3 carbon atoms; X is a halogen, preferably chlorine or bromine; $n$ is an integer of 0 to 2; $p$ is an integer of 0 to 2 and the sum of $n$ and $p$ is less than 3.

These epoxy resins are characterized by excellent flame resistance and are suitable for use in adhesives, coatings, films, molded articles and potting compounds.

The epoxy resins are prepared by reacting 2,2-bis(4'-hydroxyphenyl) - 1,1a,3,3a,4,5,5,5a,5b,6-decachlorooctahydro-1,3,4-metheno - 2H - cyclobuta[cd]pentalene or a derivative thereof having alkyl and/or halogen substituents in one or both positions ortho to each phenolic group, said bisphenols being hereinafter referred to as "DCMP bisphenols" with epichlorohydrin in the presence of an alkali. The DCMP bisphenols are white, crystalline solids of the formula:

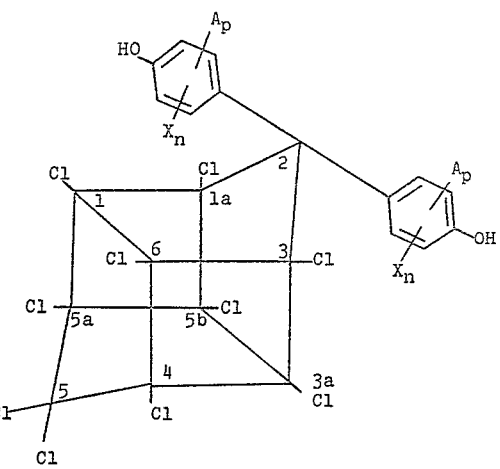

wherein A and X represent substitutes for the hydrogens in positions ortho to the phenolic hydroxyl groups with substitution on the two benzene rings being identical; A is alkyl, preferably having 1 to 3 carbon atoms; X is a halogen, preferably selected from the group consisting of chlorine and bromine; $n$ is an integer from 0 to 2; $p$ is an integer from 0 to 2, and the sum of $n$ and $p$ is less than 3. These bisphenols can be prepared by reacting 1,1a,3,3a,4,5,5,5a,5b,6 - decachlorooctahydro - 1,3,4-metheno-2H-cyclobuta[cd]pentalen-2-one with a phenolic compound of the formula:

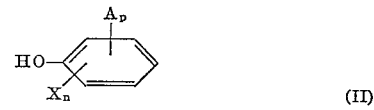

(II)

wherein A, X, $n$ and $p$ have the meanings given above, and the position para to the hydroxy group is unsubstituted, in the presence of a sulfonic acid. Said bisphenols and processes for their preparation are disclosed in more detail in copending United States application Ser. No. 435,724 of Arleen C. Pierce and Neil A. Lindo, filed Feb. 26, 1965.

The reaction between the DCMP bisphenols and epichlorohydrin must be carried out in the presence of an alkali, preferably an alkali metal hydroxide such as sodium hydroxide, potassium hydroxide or lithium hydroxide. The alkali is used in an amount sufficient to neutralize the HCl produced during the reaction and to transform the chlorohydrin formed on initial reaction of the bisphenol with epichlorohydrin into an epoxide-containing molecule. In general, it is preferred to use about 2 to 4 mols of alkali per mol of bisphenolic compound.

The reaction can be conducted at a temperature of about 50° to 150° C. Preferably, a temperature of about 65 to 120° C. is employed.

The molecular weight of the epoxy resin can be controlled by varying the relative proportion of epichlorohydrin to DCMP bisphenol. Low molecular weight epoxy resins are obtained by using a large excess epichlorohydrin such as about 15 to 50 mols of epichlorohydrin per mol of DCMP bisphenol. When a large excess of epichlorohydrin is used, the epoxy resin product is essentially a diglycidyl ether corresponding to Formula I where $m$ is 0. Higher molecular weight epoxy resins are produced using a smaller proportion of epichlorohydrin, the minimum amount of epichlorohydrin being about one mole per mol of DCMP bisphenol. The molecular weight of the epoxy resin is about 2 times the epoxy equivalent, which is defined as the weight of resin in grams which contains 1 gram equivalent of epoxy group, and can be readily determined by conventional procedures.

The use of a large excess of epichlorohydrin offers the advantage that the epichlorohydrin serves as a reaction medium making it unnecessary to employ additional solvents. When the relative amount of epichlorohydrin is reduced in order to prepare a high molecular weight epoxy resin, it is preferred to add a sufficient amount of solvent, which is inert to the reaction, to dissolve the DCMP bisphenol. Suitable solvents include aromatic hydrocarbons and chlorinated aromatic hydrocarbons. Illustrative of such solvents are benzene, toluene, cumene, xylene, naphthalene, and chlorinated derivatives thereof.

It has been found preferable to have some water present in the reaction mixture to aid in the initiation of the reaction. Quantities of water equal to at least 0.3% of the total weight of the reaction mixture have proven effective.

The epoxide resins of this invention can be cured to form a high molecular weight polymeric product with a great variety of curing agents including amino compounds such as diethylene triamine, diethylaminopropylamine, ethylene diamine, triethylene tetramine, dimethylaminepropylamine, m-phenylene diamine, triethylamine and benzyldimethylamine; polycarboxylic acid such as oxalic acid; organic anhydrides such as phthalic anhydride; amides having reactive amine groups such as dicyandiamine and the reaction product of linoleic acid dimer and ethylene diamine; Friedel-Crafts metal halides such as aluminum chloride, zinc chloride, ferric chloride and boron trifluoride, as well as complexes thereof with ethers, acid anhydrides, ketones, diazonium salts, etc.; phosphoric acid and partial esters thereof such as n-butyl orthophosphate; and salts of inorganic acids such as zinc fluoborate, potassium persulfate, nickel fluoborate, copper fluoborate, selenium fluoborate, magnesium fluoborate, tin fluoborate, potassium magnesium arsenate, magnesium sulfate, cadmium arsenate, cadmium silicate, aluminum fluoborate, ferrous sulfate, ferrous silicate, manganese hypophosphite, nickel phosphate and nickel chlorate.

The following examples are given to further illustrate the invention, but it is to be understood that the invention is not to be limited in any way by the details described therein. In the examples, parts are by weight.

Example 1

200 parts of 2,2-bis(4'-hydroxyphenyl)-1,1a,3,3a,4,5,5,5a,5b,6 - decachlorooctahydro - 1,3,4 - methano - 2H-cyclobuta[cd]pentalene, 890 parts of epichlorohydrin and 40 parts of water were mixed and heated at 90° C. for 18 hours. After cooling, 40 parts of solid potassium hydroxide were slowly added, following which the solution was boiled 30 minutes and allowed to cool. The reaction mixture was filtered and the bulk of the unreacted epichlorohydrin was distilled out under reduced pressure. The solid remaining after the distillation was crystallized from benzene yielding a solid white product having a melting point of 170 to 185° C. A second recrystallization from a methanolchloroform mixture gave 180 parts of product melting at 188 to 192° C. which was determined to be the diglycidyl ether of 2,2-bis(4'-hydroxyphenyl) - 1,1a,3,3a,4,5,5,5a,5b,6 - decachlorooctahydro-1,3,4-metheno-2H-cyclobuta[cd]pentalene. Elemental analysis showed the chlorine content to be 46.5%, which corresponded exactly with the calculated amount. The infrared spectrum showed the presence of epoxy groups and the absence of hydroxyl groups.

Example 2

15 parts of the diglycidyl ether prepared in Example 1 and 6 parts of hexahydrophthalic anhydride were admixed and heated at about 100° C. for several minutes to form a clear liquid. This liquid was then heated at 120° C. for 18 hours and 150° C. for 24 hours. Upon cooling, a clear solid polymer was obtained. It contained 32.9% chlorine and burned slowly after being placed in a flame for 30 seconds.

Example 3

Example 2 was repeated except that 0.15 part of antimony trichloride was added during the heat treatment at 120° C. The product obtained was a clear solid polymer which extinguished immediately after being held in a flame for 30 seconds.

Example 4

15 parts of the diglycidyl ether prepared in Example 1 and 5.7 parts of phthalic anhydride were admixed and heated at 140° to 150° C. at which point a clear syrup formed. This material was heated at 160–170° C. for 24 hours and then cooled to yield a clear, pale yellow, solid plastic which extinguished immediately after being held in a flame for 30 seconds.

Example 5

19 parts of 2,2-bis(4'-hydroxyphenyl)-1,1a,3,3a,4,5,5,5a,5b,6 - decachlorooctahydro - 1,3,4 - metheno - 2H-cyclobuta[cd]pentalene, 35 parts of epichlorohydrin and 0.3 part of water were admixed and 3 parts of sodium hydroxide were added at 90° to 100° C. in 4 equal increments over a one hour period, followed by heating at 95° C. for one hour to complete the reaction. The reaction mixture was diluted with 2 volumes acetone per volume of reaction mixture and filtered. The acetone was then distilled off employing a final temperature of 95° C. at 1 mm. of Hg pressure. The product was again dissolved in acetone, filtered and dried to effect further purification of the resin. The resin was then extracted with 250 parts of hot water to remove water-soluble materials. A total of 13.5 parts of polymer was obtained having an epoxide value of 462.

Example 6

19.8 parts of 2,2-bis(4'-hydroxyphenyl)-1,1a3,3a,4,5,5,5a,5b,6 - decachloroocetahydro - 1,3,4 - metheno - 2H-cyclobuta[cd]pentalene, 42 parts of epichlorohydrin and 0.26 part of water were mixed and heated to 90–100° C. and 2.64 parts of sodium hydroxide were added slowly over a one hour period, followed by heating at about 100° C. for one hour to complete the reaction. The reaction mixture was diluted with 60 parts of toluene, heated to 70° C., cooled and then filtered. The reaction product was then heated to 70° C. at 1 mm. Hg pressure to remove toluene and unreacted epichlorohydrin. A total of 18 parts of white solid polymer was obtained having an epoxide value of 555.

Example 7

20 parts of 2,2-bis(4'-hydroxyphenyl)-1,1a,3,3a,5,5,5a,5b,6 - decachlorooctahydro - 1,3,4-metheno-2H-cyclobuta[cd]pentalene, 30 parts of epichlorohydrin and 0.26 part of water were admixed and 2.7 parts of sodium hydroxide were added at 90°–100° C. over a one hour period, after which the mixture was stirred for 1¼ hours at 102° C. 34 parts of toluene were added and the solution was cooled and filtered. The mixture was then distilled at 100° C. and 1 mm. Hg pressure to remove toluene and unreacted epichlorohydrin. 20 parts of a hard resin was obtained having an epoxide value of 540.

Example 8

A portion of the epoxy resin of 2,2-bis(4'-hydroxyphenyl) - 1,1a,3,3a,5,5,5a,5b,6-decachlorooctahydro-1,3,4-metheno-2H-cyclobuta[cd]pentalene prepared in Example 6 was dissolved to 30% solids in a 40–40–20 mixture of xylene, isopropanol and methyl isobutyl ketone. The stoichiometric quantity of diethyltriamine (9 parts per 100 parts resin) was added to the solution, and the solution was cast on bonderized steel plates and cured for 4 hours at 100° C. A 2 mil thick film was obtained having the following properties:

| | |
|---|---|
| Rocker hardness [1] | 52. |
| Gardner impact [1] | P–8. |
| Film transparency | Clear. |
| Flammability [2] | Self-extinguishing. |

[1] Determined in accordance to test procedures in Gardner and Sward, "Physical and Chemical Examination of Paints, Varnishes, Lacquers and Colors," 11th edition, Gardner Laboratory, Bethesda, Md.
[2] Burning after 30 seconds in Bunsen burner flame.

*Example 9*

A portion of the epoxy resin of 2,2-bis(4'-hydroxyphenyl) - 1,1a,3,3a,5,5,5a,5b,6-decachlorooctahydro-1,3,4-metheno-2H-cyclobuta[cd]pentalene prepared in Example 6 was formulated into an adhesive by compounding with a quantity of aluminum powder equal to 40% by weight of the resin and 8 parts of dicyandiamide per 100 parts of resin. This mixture was ground into uniform powder which was placed on the end ½" x 1" section of a 0.064" thick aluminum strip 1" wide by 4½" long. A second aluminum strip of the same size was then placed over the first strip so that the one end covered the adhesively coated section of the first strip and the remainder of the second strip extended in the opposite direction from the uncoated area of the first strip. The "sandwich" was then put in a jig and subjected to thumb screw pressure while heating the entire sandwich at 190° C. for 4 hours. After cooling, the sandwich was tested for shear break strength in accordance with the method of ASTM 638–52. A value of 625 p.s.i. was obtained.

It will be apparent that many modifications and variations can be effected without departing from the scope of the novel concepts of the present invention, and the illustrative details disclosed are not to be construed as imposing undue limitations on the invention.

We claim:
1. An epoxy resin

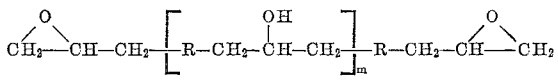

where $m$ is an integer of 0 to 5 and R is the group

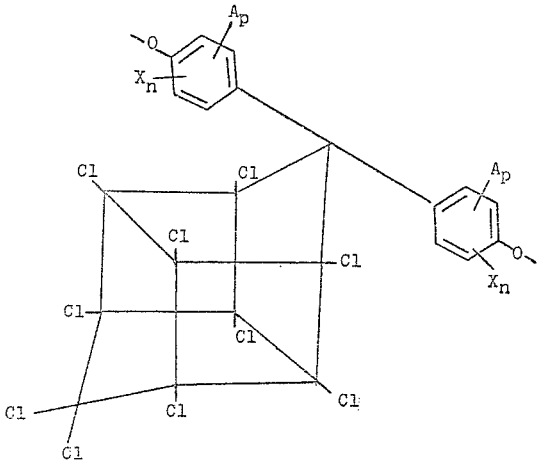

wherein A and X are substitutes for hydrogen in positions ortho to the oxygen atoms with substitution on the two benzene rings being identical, A is alkyl having 1 to 3 carbon atoms, X is chlorine or bromine, $n$ is an integer of 0 to 2, $p$ is an integer of 0 to 2, and the sum of $n$ and $p$ is less than 3.

2. An epoxy resin as claimed in claim 1 wherein $m$ is 0.

3. An epoxy resin as claimed in claim 1 wherein $n$ and $p$ are 0.

4. A high molecular weight, thermoset polymer prepared by curing the epoxy resin of claim 1 with a curing agent for bisphenol-epoxide resin.

No references cited.

WILLIAM H. SHORT, *Primary Examiner.*
T. KERWIN, *Assistant Examiner.*